(12) United States Patent
Beyeler et al.

(10) Patent No.: US 8,074,688 B2
(45) Date of Patent: Dec. 13, 2011

(54) MACHINE TOOL WITH AN EXHAUST HOOD

(75) Inventors: Markus Johannes Ernesto Beyeler, Aalen (DE); Andreas Kisselbach, Aalen (DE); Juergen Graef, Oberkochen (DE)

(73) Assignee: Leitz GmbH & Co. KG, Oberkochen (DE)

( * ) Notice: Subject to any disclaimer, the term of this patent is extended or adjusted under 35 U.S.C. 154(b) by 765 days.

(21) Appl. No.: 11/762,593

(22) Filed: Jun. 13, 2007

(65) Prior Publication Data

US 2008/0006344 A1   Jan. 10, 2008

(30) Foreign Application Priority Data

Jun. 20, 2006  (DE) .......................... 10 2006 028 203

(51) Int. Cl.
*B27G 19/00* (2006.01)
*B27G 21/00* (2006.01)
(52) U.S. Cl. ........ 144/252.1; 409/137; 83/100; 451/456
(58) Field of Classification Search ............... 144/252.1, 144/252.2; 408/67; 409/137; 83/100; 451/453, 451/456
See application file for complete search history.

(56) References Cited

U.S. PATENT DOCUMENTS

| 5,537,748 A | * | 7/1996 | Takahashi et al. | ............... 30/124 |
| 6,155,246 A | * | 12/2000 | Yamami et al. | ............. 125/13.01 |
| 7,549,450 B2 | * | 6/2009 | Thomas | .................... 144/136.95 |
| 2005/0284543 A1 | * | 12/2005 | Kaiser | ........................... 144/373 |

FOREIGN PATENT DOCUMENTS

| DE | 1 9650430 | 11/1997 |
| DE | 100 49 500 A1 | 10/2000 |
| DE | 1 0049500 | 5/2002 |

OTHER PUBLICATIONS

European Search Report for EP 07011806 dated Aug. 1, 2007.

* cited by examiner

*Primary Examiner* — Shelley Self
(74) *Attorney, Agent, or Firm* — Andrew M. Calderon; Roberts Mlotkowski Safran & Cole, P.C.

(57) ABSTRACT

A machine tool, in particular a wood-working machine, with a tool for chip removal rotating in direction of rotation D and a suction hood covering the tool with a partially opened circumferential wall that has a radial spacing A from the tool and that has a suction nozzle for suctioning off chips. In the machine tool rotating air vortices directed in the opposite direction based on the direction of rotation D of the tool can be generated in the suction hood in the area of the suction nozzle during the chip removal.

23 Claims, 5 Drawing Sheets

MACHINE TOOL WITH AN EXHAUST HOOD

CROSS REFERENCE TO RELATED APPLICATIONS

This application is based upon German patent application No. 10 2006 028 203.5, filed Jun. 20, 2006, the disclosure of which is hereby incorporated by reference thereto in its entirety and the priority of which is hereby claimed under 35 U.S.C. 119.

BACKGROUND OF THE INVENTION

1. Field of the Invention

The invention relates to a machine tool, in particular a wood-working machine, with a tool for chip removal rotating in direction of rotation D and a suction hood covering the tool with a partially opened circumferential wall that has a radial spacing A from the tool and a suction nozzle for suctioning off chips.

2. Discussion of Background Information

In known embodiments of suction hoods, the flow conditions in the hood vary substantially between the idling and processing conditions. During processing, the hood opening through which the tool interacts with the workpiece is largely closed by the workpiece. As a result, insufficient air flows into the hood, and the flow in the hood breaks down. Uncontrolled turbulences develop.

Suction hoods of this type generally have a straight hood wall running tangentially to the tool circumference in the chip intake area, so that the spacing from the tool in the direction of rotation first decreases and then increases again. A back pressure thus forms before the narrowest cross section, against which back pressure the chips have to be transported.

In particular low-mass chips and particulates that have only a low kinetic energy and therefore have to be guided and transported with the air flow inside the hood, are not adequately captured. On the one hand, they do not arrive in the hood at all or they rotate with the tool in the hood and then escape again. Undefined flow conditions prevail in the area behind the outlet opening for the chips, since here the flow of suction air and the tool's own ventilation more or less cancel one another out. These problems occur particularly in the processing of MDF, rigid foam and gypsum-bound or cement-bound materials when the powdered portion of the chips predominates or the chips have a low mass.

A machine tool, in particular a wood-working machine, is known from DE 100 49 500 A1, with a tool for chip removal having at least one cutting edge and a suction hood covering the tool with a partially opened circumferential wall and a suction connection for suctioning chips. The circumferential wall of the suction hood is embodied in a conically or spherically curved form in the area of the rotational plane of the at least one cutting edge of the tool and the suction connection is arranged in the area of the largest diameter.

In the case of low-mass chips and particulates that have only a low kinetic energy, there is a danger that they will be captured only inadequately and will not arrive in the hood or will leave the hood again after the revolution of the tool. The area located behind the outlet opening for the chips in the direction of rotation is problematic, since here the direction of movement of the tool cutting edges runs counter to the suction direction and the two flows cancel one another out to a certain extent. Particles that have flown past the outlet opening can no longer be suctioned and leave the hood again through the processing opening. In the case of low-mass chips and particulates it does not help either to provide the conical shape of the interior wall for a second, axially displaced chip circulation, since a certain kinetic energy of the particles is necessary for this chip circulation.

SUMMARY OF THE INVENTION

Based on this problem, the invention improves a machine tool such that even low-mass chips and particulates can be suctioned. The machine tool solves the problem in that rotating air vortices directed in the opposite direction based on the direction of rotation D of the tool can be generated in the suction hood in the area of the suction nozzle during the chip removal, i.e., a mechanism is provided there through which the air vortices are generated.

A type of blocking air is thus generated in the hood so that virtually no chips or dust particles now leave the suction hood across the area. In order for it to be possible to achieve this blocking effect, the direction vectors must be opposed to the direction of rotation of the tool and of the air vortex in the area of the suction nozzle. Rotating air vortices directed in opposite directions are thus generated, which vortices release the particles still remaining in the chip spaces of the tool and feed the particles to the suction nozzle. The area of the suction nozzle means the part of the circumferential wall lying directly behind the suction nozzle based on the direction of rotation D of the tool as well as the part of the circumferential wall in which the suction nozzle is located. The important factor is that an air vortex directed in the opposite direction to the direction of rotation D of the tool can be generated in this area.

It has been shown that static chips that reach the suction hood open on the circumferential side in the area behind the suction nozzle from outside are drawn into the suction hood against the tool's own ventilation. A type of injector action is thus produced through the air vortex generated in the interior of the suction hood and rotating in the opposite direction to the direction of rotation D of the tool, which action renders possible the chip transport against the direction of rotation of the tool or draws air from outside into the suction hood against the direction of rotation of the tool, which air, as a type of blocking air, can release chips from the chip spaces of the tool and feed them to the suction.

To generate the air vortex, the circumferential wall of the suction hood is advantageously curved with a radius of curvature r, which is smaller than the radius R of the tool. In this manner an air vortex that has an adequate blocking action can be generated. The curvature in the hood wall can be circular arc-shaped and advantageously extends over a range of 90° to 270°. It can thus be ensured that that an adequate air vortex is generated. It has been shown that a curvature of <90° is also sufficient to produce an adequate air vortex. The curvature of the hood wall can extend in particular in a range of greater than 90° or greater than 180°.

So that no back pressure can form between chips and particulates and the circumferential wall of the covering hood, radial spacing A of the circumferential wall from the tool does not decrease in the direction of rotation D of the tool towards the suction nozzle. The radial spacing remains the same or increases. In this manner light chips can also be prevented from already leaving the hood again at the intake opening. The tool can lie completely inside the suction hood or emerge at least partially from the suction hood.

If this design is not possible for reasons of space, another embodiment of the suction hood provides that the hood wall in the intake area of the chips at first runs equidistant to the tool in some areas, and the radial spacing from the tool then increases up to the outlet opening.

The machine tool according to the invention is equally suitable for synchronous or contrarotating processing. To ensure that as far as possible all the chips and particulates enter the suction hood, it is advantageous if the wall of the suction hood partially encloses the tool in the passage direction during processing.

It is particularly advantageous if the shape of the passage opening of the suction hood corresponds to the workpiece contour. With contrarotating processing, that is the contour of the unprocessed workpiece; with synchronous processing, the finished contour after processing.

So that sufficient air can always flow into the suction hood and the air vortices can be maintained, even if the working opening is largely closed by the workpiece during processing, a protective grid or a perforated plate that is air-permeable is preferably arranged in the direction of rotation D of the tool behind the area of the air vortex of the suction hood.

BRIEF DESCRIPTION OF THE DRAWINGS

Exemplary embodiments of the invention are explained in more detail based on the following drawings.

DETAILED DESCRIPTION OF THE PRESENT INVENTION

Figure 8:
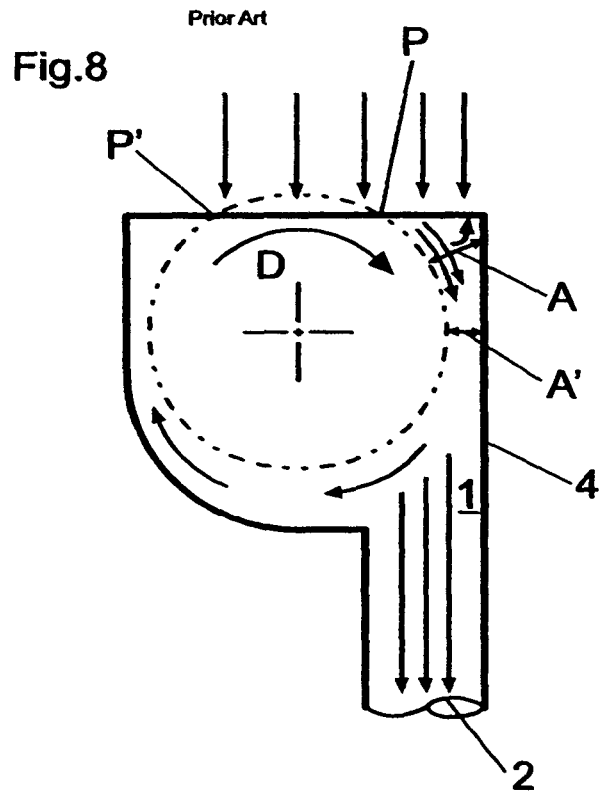
FIG. 8 shows a diagrammatic representation of a machine tool according to the prior art.

FIG. 8 shows a machine tool with a suction hood 1 according to the prior art. The radial distance A or A' from the tool 3 to the circumferential wall 4 of the suction hood 1 decreases from the entrance point P of the tool 3 in the direction of rotation D of the tool 3. In this way, a back pressure forms for the suctioned chips or particulates in the area of the spacing A'. This back pressure prevents all the chips from being suctioned into the suction hood 1 and transported away into the suction nozzle 2. Some of the chips are conveyed out of the suction hood 1 again because of the back pressure.

Figure 9:
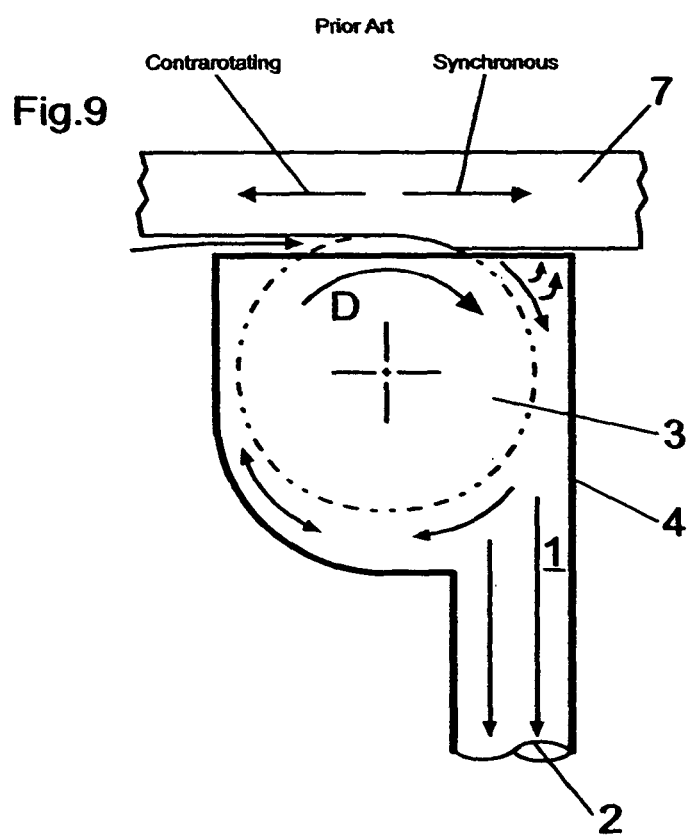
FIG. 9 shows a diagrammatic representation of another machine tool according to the prior art with a workpiece.

FIG. 9 shows another machine tool according to the prior art. This tool includes a suction hood 1 with a circumferential wall 4 and a suction nozzle 2 in which a tool 3 rotates in the direction of rotation D. A workpiece 7 is machined by the tool 3 either in either a contrarotating or synchronized manner through the tool 3. The flow rate in the interior of the suction hood 1 is greatly reduced because the workpiece 7 considerably reduces the size of the air intake area of the suction hood 1, so that the turbulences in the intake area of the chips are substantially increased and chips can leave the suction hood 1 again and become attached to the surface of the workpiece 7.

Figure 1:
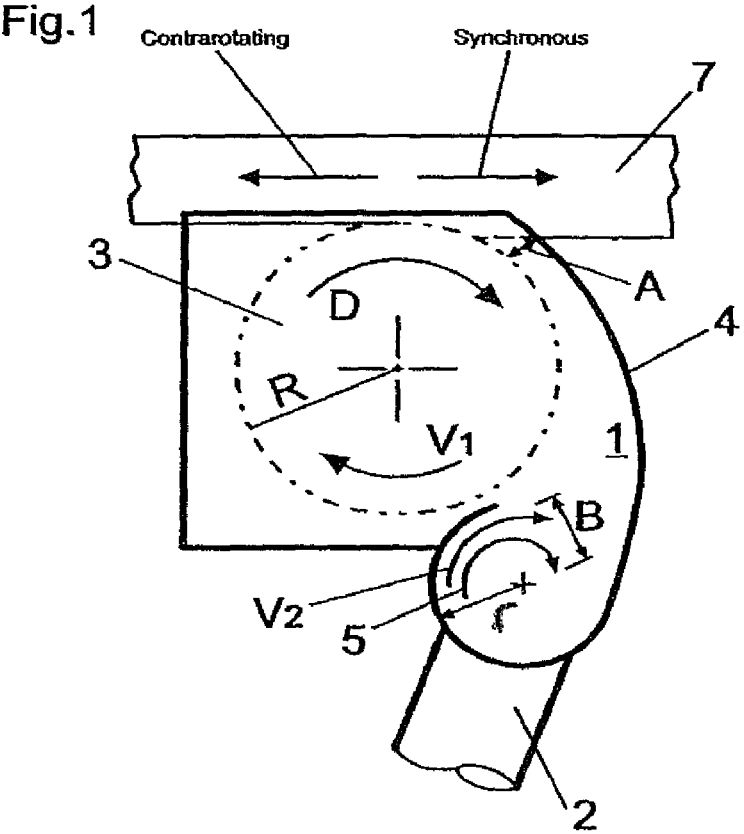
FIG. 1 shows a diagrammatic representation of a first machine tool with a tool and a suction hood.

FIG. 1 shows a machine tool for working wood, comprising a suction hood 1, a suction nozzle 2 and a tool 3. The suction hood 1 has a partially opened circumferential wall 4 enclosing the suction hood 1. The rotating tool 3 has a direction of rotation D and a radius R. The chips produced by machining a workpiece 7 are suctioned off through the suction nozzle 2. Air vortices 5 directed in the opposite direction with respect to the direction of rotation D of the tool 3 are generated in the interior of the suction hood 1 in the area of the suction nozzle 2.

The rotating air vortices 5 directed in the opposite direction generate a blocking action which prevents even low-mass chips and particulates from leaving the suction hood, and virtually all the chips and particulates are guided in the direction of the suction nozzle 2 and suctioned off. At the final point of the circumferential wall 4 in the area of the suction nozzle 2 the direction vector V1 of the air vortices on the tool 3 and the direction vector V2 of the air vortices 5 are directed in opposite directions.

The circumferential wall 4 can be completely opened in the area behind the air vortex 5 rotating in the opposite direction to the tool direction of rotation D, or it can be embodied from an air-permeable, pierced wall (e.g., perforated plate). Static chips that arrive from outside at the suction hood 1 open on the circumferential side into the area behind the suction nozzle 2 are drawn into the suction hood 1 between the tool 3 and the hood wall 4 against the tool's 3 own ventilation. Through the air vortices generated in the interior of the suction hood 1 and rotating in the opposite direction of the direction of rotation D of the tool 3, a type of injector action is produced that renders possible the chip transport against the direction of rotation D of the tool 3 or suctions air from outside into the suction hood 1 against the direction of rotation D of the tool 3. The circumferential wall 4 has a curvature <90° in the area 3 of the air vortex 5.

Figure 2:
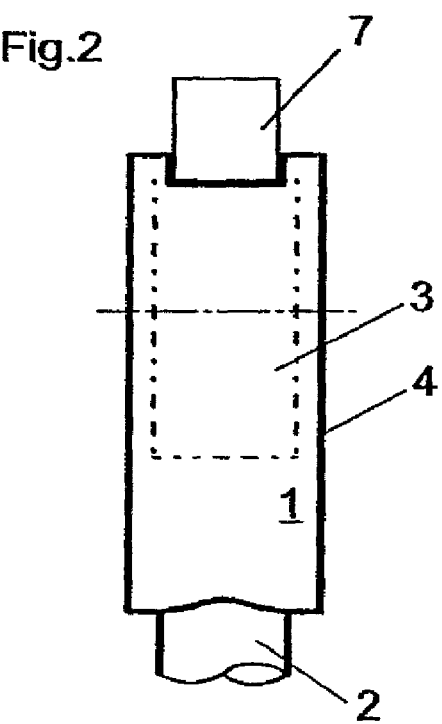
FIG. 2 shows a diagrammatic representation of a suction hood and a workpiece.

FIG. 2 shows the machine tool from FIG. 1 in a side view. The suction hood 1 of the machine tool has a circumferential wall 4 and a suction nozzle 2. The tool 3 located in the interior of the suction hood processes the workpiece 7 guided past the suction hood 1. The chips forming during the machining of the workpiece 7 are guided inside the suction hood 1 along the circumferential wall 4 to the suction nozzle 2. Rotating air vortices 5 directed in the opposite direction to the direction of rotation of the workpiece 3 thereby ensure that no chips or particulates now leave the suction hood 1. The contour of the circumferential wall 4 of the covering hood 1 is adapted to the contour of the workpiece 7.

Figure 3:
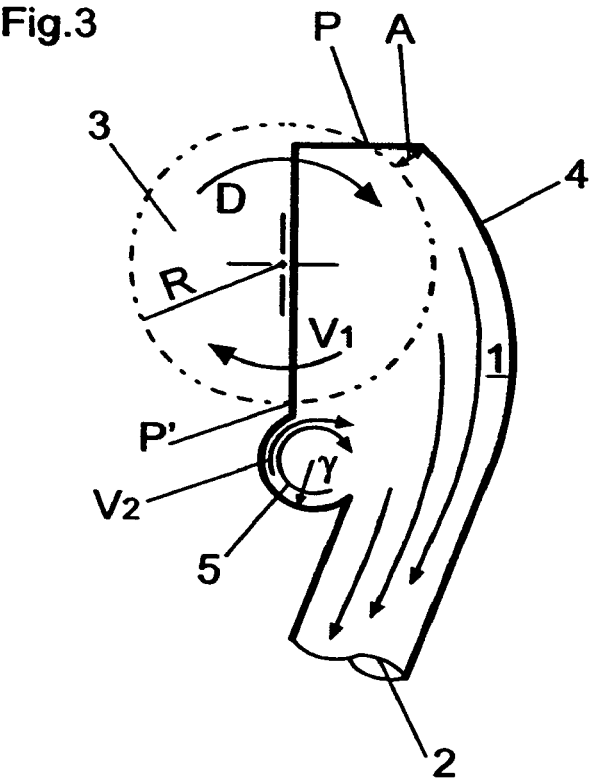
FIG. 3 shows a diagrammatic representation of another machine tool with a tool and a suction hood.

FIG. 3 shows a machine tool for working wood, comprising a suction hood 1, a suction nozzle 2 and a tool 3. The suction hood 1 has a partially opened circumferential wall 4 surrounding it, which wall has a radial spacing A from the tool 3. The tool 3 enters the suction hood 1 at the entry point P and exits the suction hood 1 again at the exit point P'. The rotating tool 3 has a direction of rotation D and a radius R. The chips produced by the machining of a workpiece are suctioned off through the suction nozzle 2. Rotating air vortices 5 directed in the opposite direction based on the direction of rotation D of the tool 3 are generated in the interior of the suction hood 1 in the area behind the suction nozzle 2 at the exit point P' of the tool 3. At the point P' the direction vector V1 of the air vortices at the tool 3 and the direction vector V2 of the air vortices 5 are directed in the opposite direction. Through the alignment of the two air vortices in opposite directions, a blocking action is achieved, which prevents even low-mass chips and particulates from leaving the suction hood 1, and virtually all the chips and particulates can be guided in the direction of the suction nozzle 2 and suctioned off. Even chips that are located outside the suction hood 1 in the area of the exit point P' are suctioned into the suction hood 1, since a type of injector action is generated through the air vortices generated in the opposite direction to the direction of rotation D of the tool 3, so that air and chips from outside are suctioned in against the tool's 3 own ventilation.

Figure 4:
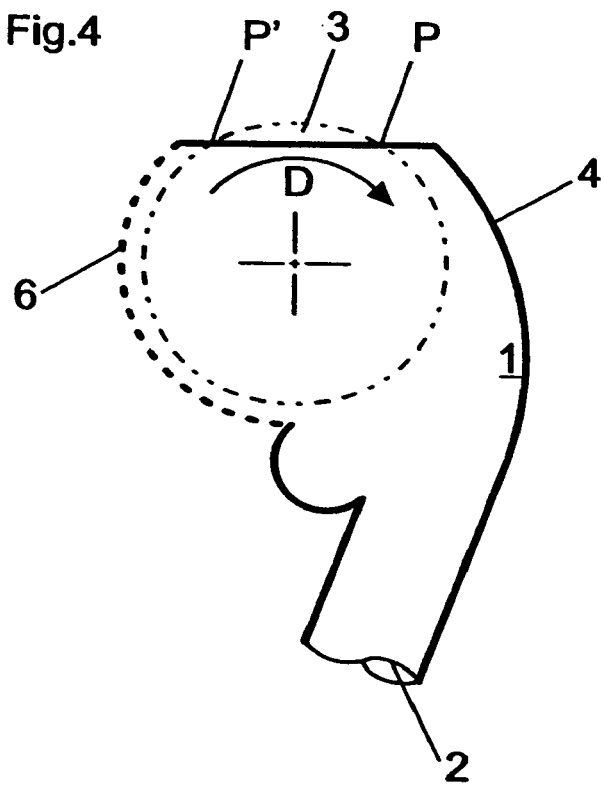
FIG. 4 shows a diagrammatic representation of another machine tool with a tool and a suction hood.

FIG. 4 shows the machine tool from FIG. 3 with the difference that a pierced structure 6, in this case a perforated plate, is provided in the area lying behind the suction nozzle 2 based on the direction of rotation D of the tool 3. It can be ensured through this perforated plate that an adequate air flow rate is available in the suction hood 1 even during the processing of workpieces. It can also be ensured that the air vortices 5 do not fail. The exit point P' of the tool from the suction hood 2 is displaced into the plane of the entry point.

Figure 5:
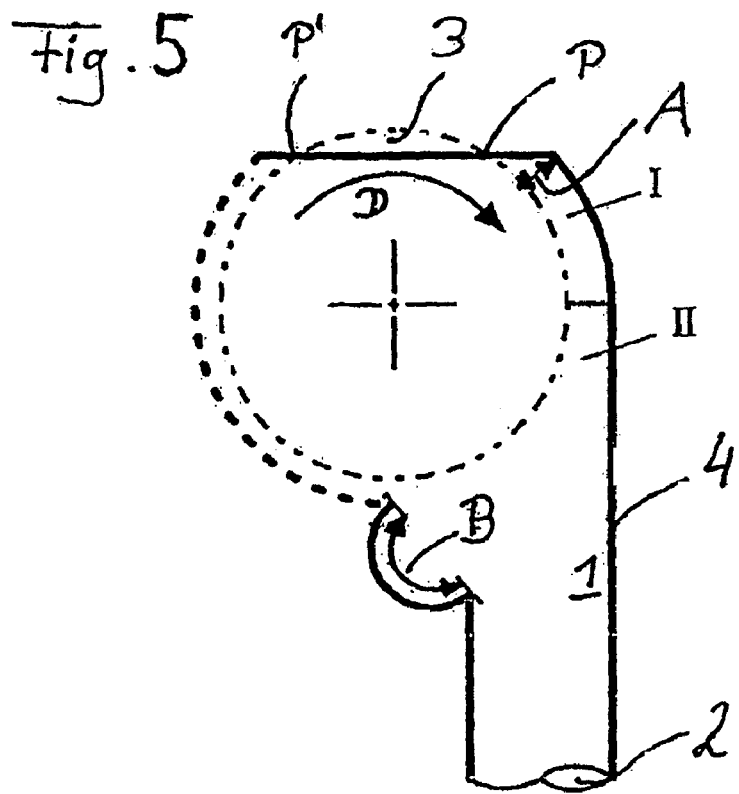
FIG. 5 shows a diagrammatic representation of another machine tool with a tool and a suction hood.

FIG. 5 shows another machine tool according to FIG. 4 with a tool 3, a suction hood 1 with a circumferential wall 4 and a suction nozzle 2. The radial spacing A between the circumferential wall 4 and the tool 3 is constant from the entry point P of the tool 3 into the suction hood 1 and increases in the direction of rotation D of the tool 3 up to the suction nozzle 2. The fact that the radial spacing A between the tool 3 and the circumferential wall 4 does not decrease, ensures that no back pressure develops between the circumferential wall 4 and the workpiece 3 in the interior of the suction hold 1. The back pressure can lead to the air flow stalling in the interior of the suction hood 1 and the chip and dust transport deteriorating in the direction of the suction nozzle 2. In particular in the first area I, the spacing A from the circumferential wall 4 to the tool 3 is equidistant. In the area II, the spacing A increases in the direction of rotation D of the tool 3 for an optimized chip and dust transport. The circumferential wall 4 has a curvature B of 180° in the area behind the suction nozzle.

Figure 6:
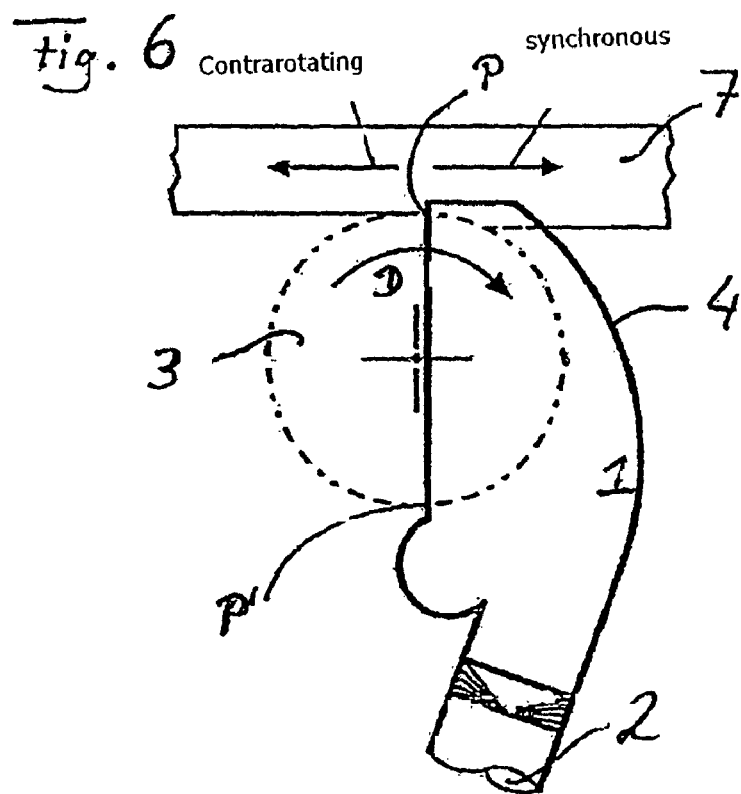
FIG. 6 shows a diagrammatic representation of another machine tool with a tool and a suction hood and a workpiece.

FIG. 6 shows a machine tool with a suction hood 1 and a tool 3. A workpiece 7 is worked by the tool 3 in a contrarotating or synchronous manner. Even during the processing of the workpiece 7, the air intake area for the suction hood 1 is not so greatly reduced that the air flow in the interior of the suction hood 1 could stall. An air intake area remains that makes it possible for air to flow behind into the suction hood 1. The circumferential wall 4 of the suction hood 1 encloses the tool 3 only partially.

Figure 7:
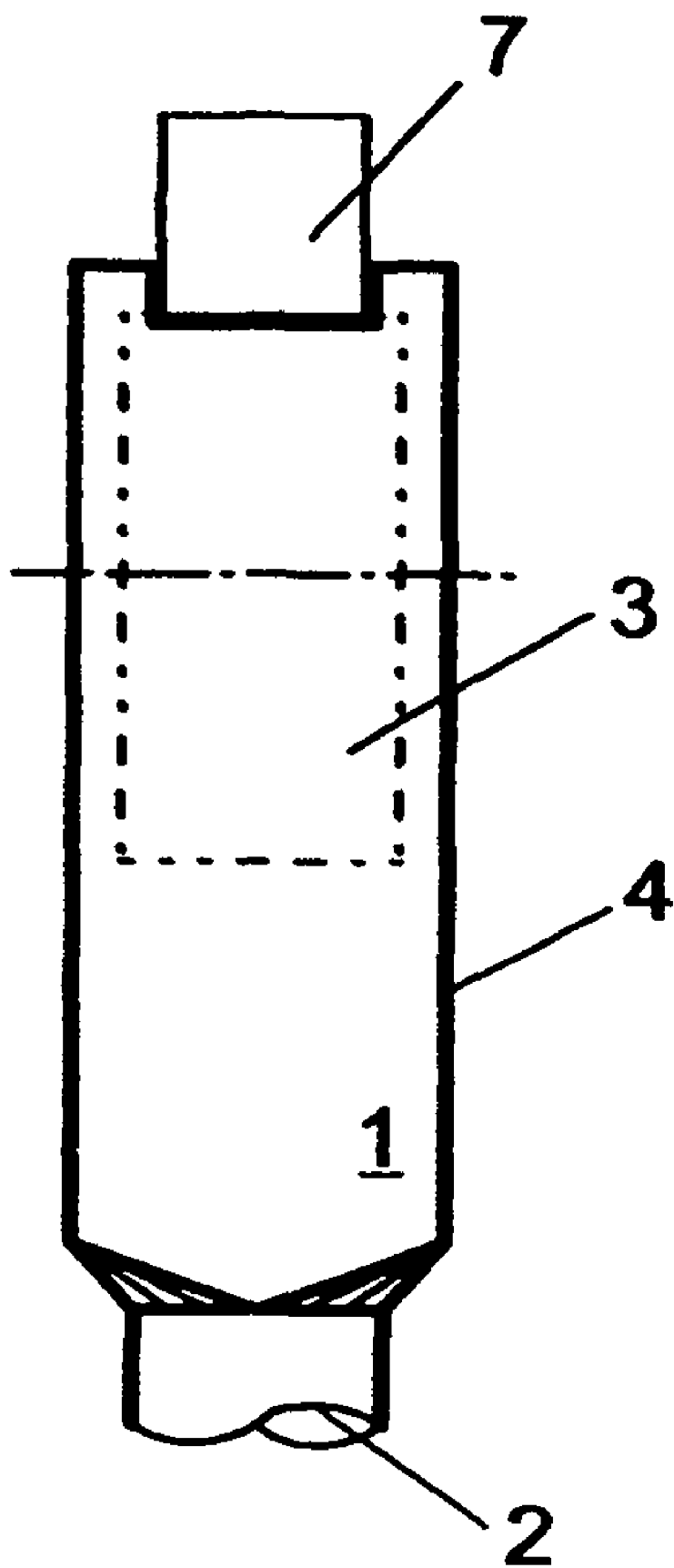
FIG. 7 shows a diagrammatic representation of a suction hood and a workpiece.

FIG. 7 shows the machine tool from FIG. 3 in a side view. The suction hood 1 of the machine tool has a circumferential wall 4 and a suction nozzle 2. The tool 3 located in the interior of the suction hood 1 processes the workpiece 7 guided past the suction hood 1. The chips being generated during the machining of the workpiece 7 are guided inside the suction hood 1 along the circumferential wall 4 to the suction nozzle 2. Rotating air vortices 5 directed in the opposite direction to the direction of rotation of the tool 3 thereby ensure that no chips or particulates leave the suction hood 1 at the point P'. The contour of the circumferential wall 4 of the covering hood 1 is adapted to the workpiece contour.

What is claimed is:

1. A machine tool comprising:
    a tool for chip removal rotating in direction of rotation D;
    a suction hood covering the tool with a partially opened circumferential wall that has a radial spacing A from the tool, the suction hood has a suction nozzle for suctioning off chips,
    wherein rotating air vortices directed in an opposite direction based on the direction of rotation D of the tool are generated in the suction hood in an area of the suction nozzle during the chip removal and, to generate the air vortices in a region of the suction nozzle or directly behind the suction nozzle, the circumferential wall of the suction hood has at least one radius of curvature r, which is smaller than the radius R of the tool so a deflection of the air flow is produced counter to the direction of rotation D of the tool in such a way that, at an end point of a peripheral wall of the suction nozzle, a direction vector (V1) of the air vortices at the tool and a direction vector (V2) of the air vortices are directed in opposite directions.

2. The machine tool according to claim 1, wherein the air vortices are generated in an area directly behind the suction nozzle based on the direction of rotation D of the tool.

3. The machine tool according to claim 2, wherein the curvature is circular arc-shaped.

4. The machine tool according to claim 2 wherein the curvature of the circumferential wall extends in a range of 90 to 270°.

5. The machine tool according to claim 3 wherein the curvature of the circumferential wall extends at an angle of <90°.

6. The machine tool according to claim 1, wherein the radial spacing A of the circumferential wall from the tool in the direction of rotation D of the tool towards the suction nozzle remains at least constant.

7. The machine tool according to claim 1, wherein the circumferential wall has in parts a pierced structure.

8. The machine tool according to claim 7, wherein the pierced structure is provided in an area lying behind the suction nozzle based on the direction of rotation D of the tool.

9. The machine tool according to claim 1, wherein the radial spacing A of the circumferential wall from the tool in the direction of rotation D of the tool towards the suction nozzle increases.

10. The machine tool according to claim 1, wherein the circumferential wall has in parts a grid or perforated structure.

11. A machine tool for working wood, comprising
    a suction nozzle;
    a tool having a direction of rotation D and a radius R; and
    a suction hood having a partially opened circumferential wall, the suction hood comprises the suction nozzle, the suction hood structured to generate air vortices directed in an opposite direction with respect to the direction of rotation D of the tool in an interior of the suction hood in an area of the suction nozzle during chip removal and, to generate the air vortices in a region of the suction nozzle or directly behind the suction nozzle, the circumferential wall is configured so a deflection of the air flow is produced counter to the direction of rotation D of the tool in such a way that, at an end point of a peripheral wall of the suction nozzle, a direction vector (V1) of the air vortices at the tool and a direction vector (V2) of the air vortices are directed in opposite directions.

12. The machine tool according to claim 11, wherein the partially opened circumferential wall is structured such that, at a final point in the area of the suction nozzle, a direction vector V1 of the air vortices on the tool and a direction vector V2 of the air vortices are in opposite directions.

13. The machine tool according to claim 11, wherein the partially opened circumferential wall is completely opened in an area behind the air vortices rotating in the opposite direction to the tool direction of rotation D.

14. The machine tool according to claim 11, wherein the partially opened circumferential wall includes an air-permeable, pierced wall.

15. The machine tool according to claim 13, wherein the partially opened circumferential wall is structured such that through alignment of the air vortices in opposite directions, a blocking action is achieved, which prevents low-mass chips and particulates from leaving the suction hood.

16. The machine tool according to claim 13, wherein the partially opened circumferential wall is structured such that chips that are located outside the suction hood in the area of an exit point P' are suctioned into the suction hood.

17. The machine tool according to claim 11, further comprising a radial spacing between the partially opened circumferential wall and the tool, the radial spacing being constant from an entry point P of the tool into the suction hood and increasing in a direction of rotation D of the tool up to the suction nozzle.

18. The machine tool according to claim 11, further comprising a radial spacing between the partially opened circumferential wall and the tool which does not decrease thereby ensuring that no back pressure develops between the partially opened circumferential wall and the tool in an interior of the suction hood.

19. The machine tool according to claim 11, wherein the partially opened circumferential wall has a radius of curvature r smaller than a radius R of the tool.

20. The machine tool according to claim 1, wherein the curvature is circular arc-shaped.

21. The machine tool according to claim 20 wherein the curvature of the circumferential wall extends at an angle of <90°.

22. The machine tool of claim 11, wherein the circumferential wall of the suction hood has at least one radius of curvature r, which is smaller than the radius R of the tool so the deflection of the air flow is produced counter to the direction of rotation D of the tool in such a way that, at an end point of the peripheral wall in the region of the suction nozzle, the direction vector (V1) of the air vortices at the tool and the direction vector (V2) of the air vortices are directed in the opposite directions.

23. A machine tool for working wood, comprising
a suction nozzle;
a tool having a direction of rotation D and a radius R; and
a suction hood having a partially opened circumferential wall enclosing the suction hood, the suction hood comprises the suction nozzle, the suction hood structured to generate air vortices directed in an opposite direction with respect to the direction of rotation D of the tool in an interior of the suction hood in an area of the suction nozzle during the chip removal and, to generate the air vortices in a region of the suction nozzle or directly behind the suction nozzle, the circumferential wall is configured so a deflection of the air flow is produced counter to the direction of rotation D of the tool in such a way that, at an end point of a peripheral wall of the suction nozzle, a direction vector (V1) of the air vortices at the tool and a direction vector (V2) of the air vortices are directed in opposite directions, wherein the partially opened circumferential wall is structured such that through alignment of the air vortices in opposite directions, a blocking action is achieved, which prevents low-mass chips and particulates from leaving the suction hood.

* * * * *